(12) United States Patent
Sonksen et al.

(10) Patent No.: US 8,504,750 B1
(45) Date of Patent: Aug. 6, 2013

(54) SYSTEM AND METHOD TO PROCESS EVENT REPORTING IN AN ADAPTER

(75) Inventors: Bradley S. Sonksen, Rancho Santa Margarita, CA (US); Richard S. Moore, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 684 days.

(21) Appl. No.: 12/572,835

(22) Filed: Oct. 2, 2009

Related U.S. Application Data

(60) Provisional application No. 61/219,594, filed on Jun. 23, 2009.

(51) Int. Cl.
*G06F 13/24* (2006.01)
(52) U.S. Cl.
USPC .......................................... 710/243; 710/262
(58) Field of Classification Search
USPC ................................................ 710/243, 262
See application file for complete search history.

(56) References Cited

U.S. PATENT DOCUMENTS

| | | | | |
|---|---|---|---|---|
| 5,463,752 | A | * | 10/1995 | Benhase et al. ............... 711/154 |
| 7,080,177 | B2 | * | 7/2006 | Neuman ....................... 710/240 |
| 7,263,568 | B2 | * | 8/2007 | Shah et al. .................... 710/267 |
| 7,769,937 | B2 | * | 8/2010 | Moorkanikara Nageswaran et al. ............................. 710/264 |
| 2005/0078694 | A1 | * | 4/2005 | Oner ............................. 370/412 |
| 2009/0276775 | A1 | * | 11/2009 | Brown et al. ................. 718/100 |

* cited by examiner

*Primary Examiner* — Nimesh G Patel
(74) *Attorney, Agent, or Firm* — Klein, O'Neill & Singh, LLP

(57) ABSTRACT

Method and system for an adapter is provided. The adapter includes a plurality of function hierarchies, with each function hierarchy including a plural functions and each function being associated with an event. The adapter also includes a plurality of processors for processing one or more events generated by the plurality of functions. The adapter further includes a first set of arbitration modules, where each arbitration module is associated with a function hierarchy and receives interrupt signals from the functions within the associated function hierarchy and selects one of the interrupt signals. The adapter also includes a second set of arbitration modules, where each arbitration module receives processor specific interrupt signals and selects one of the interrupt signals for processing an event associated with the selected interrupt signal.

11 Claims, 8 Drawing Sheets

SYSTEM AND METHOD TO PROCESS EVENT REPORTING IN AN ADAPTER

CROSS-REFERENCE TO RELATED APPLICATIONS

This application claims priority to U.S. provisional application Ser. No. 61/219,594, filed on Jun. 23, 2009, entitled "SYSTEM AND METHOD TO PROCESS EVENT REPORTING IN AN ADAPTER", the disclosure of which is incorporated herein in its entirety.

BACKGROUND

The present disclosure relates to adapters.

Computing systems communicate with other devices using adapters, e.g. host bus adapters (HBAs), network interface cards or adapters that can handle both network and storage traffic (may interchanagbly be referred to as an adapter of HBA). For some applications, network adapters may use multiple functions and multiple processors. Each processor may communicate with one or more functions. Each function may have to report events that may need processor intervention. As the number of functions and number of processors increase in a network adapter, there is a need to provide for efficient mechanism to communicate between multiple functions and multiple processors.

SUMMARY

In one embodiment, an adapter is provided. The adapter includes a plurality function hierarchies, with each function hierarchy including a plurality of functions and each function being associated with an event. The adapter also includes a plurality of processors for processing one or more events generated by the plurality of functions. Each of the plurality of functions is associated with a processor from among the plurality of processors.

The adapter further includes a first set of arbitration modules, where each arbitration module is associated with a function hierarchy and receives interrupt signals from the functions within the associated function hierarchy, arbitrates between pending interrupt request signals and selects one of the interrupt signals.

The adapter also includes a masking logic that receives a plurality of interrupt signals from the first set of arbitration modules and separates the interrupt signals based on associated processors. The adapter also includes a second set of arbitration modules, where each arbitration module receives processor specific interrupt signals and selects one of the interrupt signals for processing an event associated with the selected interrupt signal.

In one embodiment, a system is provided. The system includes a computing system operationally coupled to a network adapter that is operationally coupled to a network device. The network adapter includes a plurality of function hierarchies, with each function hierarchy including a plurality of functions and each function being associated with an event. The adapter also includes a plurality of processors for processing one or more events generated by the plurality of functions. Each of the plurality of functions is associated with a processor from among the plurality of processors.

The adapter further includes a first set of arbitration modules, where each arbitration module is associated with a function hierarchy and receives interrupt signals from the functions within the associated function hierarchy, arbitrates between pending interrupt request signals and selects one of the interrupt signals. The adapter also includes a second set of arbitration modules, where each arbitration module receives processor specific interrupt signals and selects one of the interrupt signals for processing an event associated with the selected interrupt signal.

In yet another embodiment, a method for an adapter, is provided. The method includes (a) providing a plurality of function hierarchies, each hierarchy including a plurality of functions and each function being associated with an event that is processed by a process from among a plurality of processors. Each function hierarchy is assigned a first arbitration module that is used for arbitrating between interrupt request signals originating from the function hierarchy; and each processor has an assigned second arbitration module configured to arbitrate between interrupt request signals for events that are associated with a specific processor.

The method further includes: (b) collecting event status for the plurality of functions associated with the plurality of function hierarchies; (c) based on the collected event status, generating an interrupt request signal for each function within a function hierarchy that had a change in status, wherein interrupt request signals for each function hierarchy is sent to the assigned first arbitration module for arbitration; (e) selecting a function from each of the plurality of function hierarchies; wherein each of the assigned first arbitration modules selects an interrupt request signal for each function hierarchy; (f) sending all interrupt request signals associated with events for a specific processor from among the plurality of processors to the second arbitration module assigned to the specific processor; (g) selecting one of the interrupt request signals based on an arbitration performed by the assigned second arbitration module; and (h) processing an event associated with the interrupt request signal selected in step (g).

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various aspects of this disclosure. In the drawings, the same components have the same reference numerals. The illustrated embodiments are intended to illustrate, but not to limit the disclosure. The drawings include the following Figures.

DETAILED DESCRIPTION

In one embodiment, an adapter and method is provided to process event reporting between a plurality of functions and a plurality of processors. This reduces the number of signal lines that may be typically required to communicate between the functions and the processors.

To facilitate an understanding of the various aspects of this disclosure, the general architecture and operation of a system to send and receive information is disclosed. The specific architecture and operation of the various aspects will then be described with reference to the general architecture of the host system and the adapter.

Figure 1A:
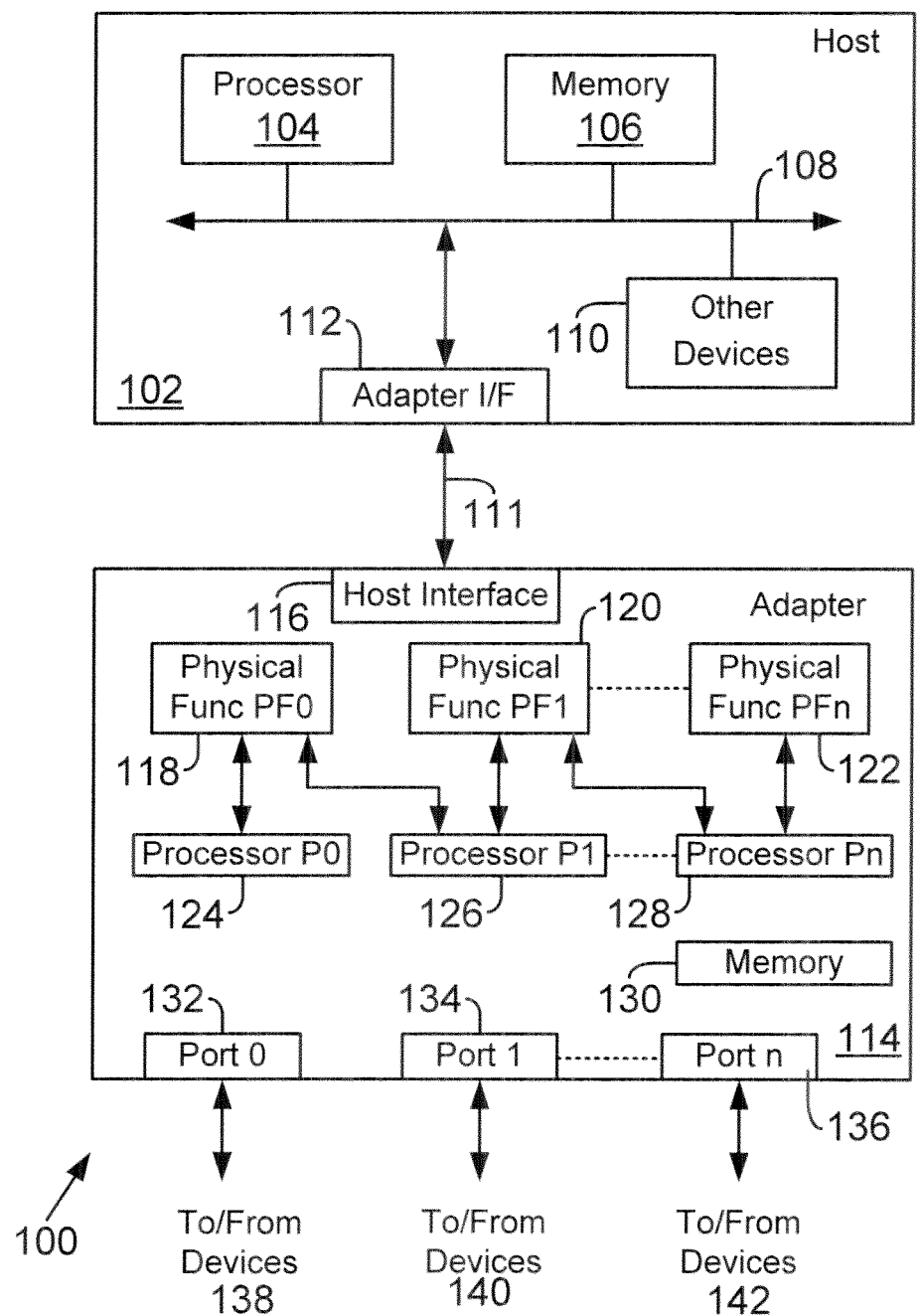
FIG. 1A shows a block diagram of system 100 for sending and receiving information.

System:

FIG. 1A shows a block diagram of system 100 for sending and receiving information. System 100 may include a computing system 102 (also known as "host system") and an adapter 114.

Host system 102 may include a host processor 104, memory 106, other devices 110, and adapter interface 112, all operationally coupled via bus 108.

Host system 102 interfaces with adapter 114 via Adapter interface 112 and bus 111, which in this case may be a PCI Express bus. The adapter 114 may include a host interface 116, which may be used to communicate with the host system 102 via adapter interface 112.

The adapter 114 may also include a plurality of physical functions. For example, the adapter may include PF0 physical function 118, PF1 physical function 120 and PFn physical function 122.

Adapter 114 may also include a plurality of processors 124, 126 and 128. For example, adapter 114 may include P0 processor 124, P1 processor 126 and Pn processor 128. Processors 124, 126 and 128 may be referred to as "embedded" processors.

In one embodiment, a physical function may be mapped to one or more processors. For example, PF0 physical function 118 may be mapped to P0 processor 124 and P1 processor 126. PF1 physical function 120 may be mapped to P1 processor 126 and Pn processor 126. Similarly, PFn physical function 122 may be mapped to Pn processor 128. Each physical function may include one or more virtual functions, which are described below in detail, with reference to FIG. 1C. A physical function with its associated virtual function is referred to as a physical function hierarchy. Virtual function and physical function hierarchy is also described with reference to FIG. 1C.

Adapter 114 may include memory 130. Memory 130 may store programmable instructions (for example, firmware) (not shown), which may be executed by one or more processors of adapter 114 to run overall operation of adapter 114.

Adapter 114 may include one or more ports to interface with different devices. For example, adapter 114 may include a plurality of ports 132, 134 and 136. For example port 132 referenced as port 0 may interface with device 138, port 134 referenced as port 1 may interface with device 140 and port 136 referenced as port n may interface with device 142.

Device 138, 140 and 142 may each comply with different communication and interface protocols. For example, device 138 may be a network device that complies with Ethernet network protocol. Device 140 may be a storage device that complies with fibre channel protocol.

Figure 1B:
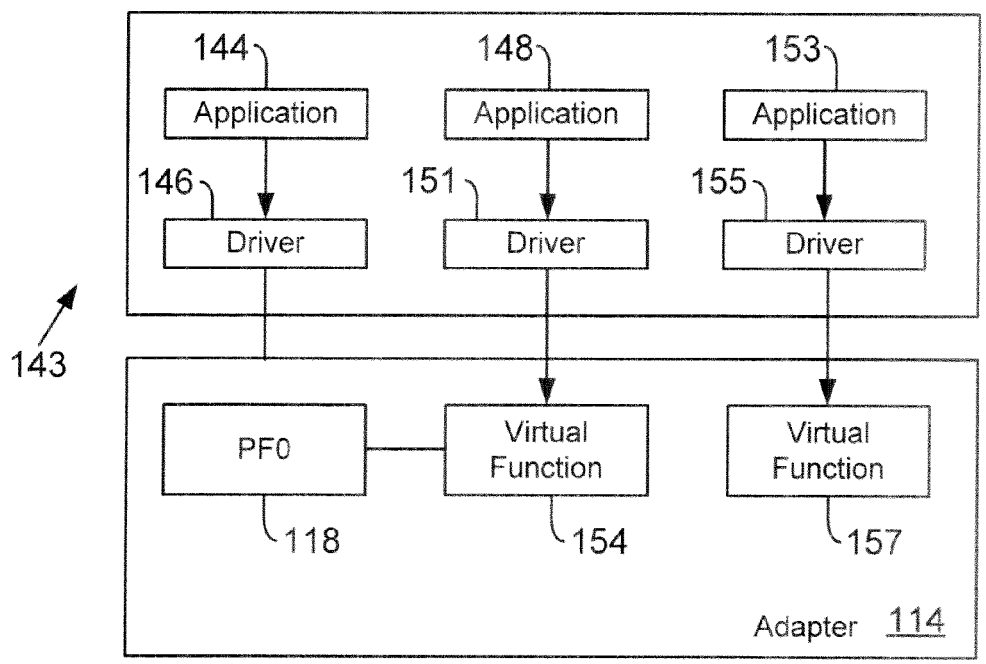
FIG. 1B shows an example of a software architecture used by the system of FIG. 1A.

FIG. 1B shows an example of a software architecture 143 used by system 100 of FIG. 1A. Software architecture 143 includes a plurality of applications and a plurality of drivers. The applications and drivers may be executed by host system 102. The applications may communicate with physical functions and virtual functions of adapter 114 via the drivers.

For example, software architecture 140 may include applications 144, 148 and 153. Application 144 may communicates with driver 146, which is configured to communicate with physical function PF0 118. Application 148 may communicate with driver 151, which is configured to communicate with virtual function 154. Application 153 may communicate with driver 155, which is configured to communicate with virtual function 157.

Figure 1C:
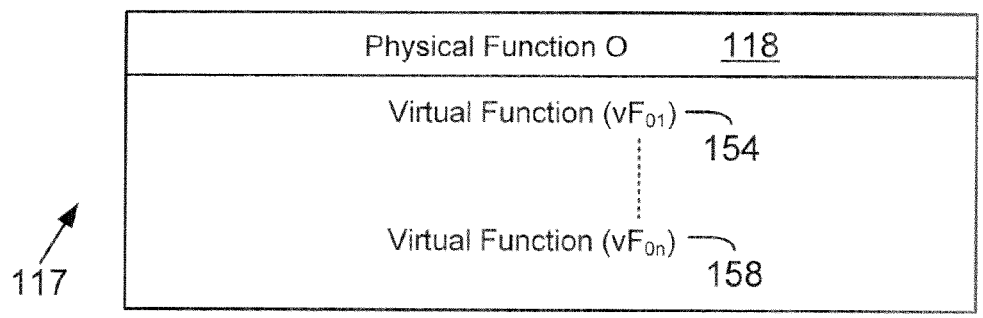
FIG. 1C shows an example of a physical function hierarchy used according to one embodiment.

FIG. 1C shows an exemplary physical function hierarchy 117 having a physical function and a plurality of virtual functions. For example, PF0 physical function 118 may include a plurality of virtual functions, for example, VF01 virtual function 154 and VF0n virtual function 158. PF0 physical function 118 together with VF01 virtual function 154 and VF0n virtual function 158 is referred to as PF0 physical function hierarchy.

Now referring to FIG. 2, an event management system 200 (sometimes referred to as "EM system 200") of the current disclosure will be described in detail. In one embodiment, the EM system 200 is located in adapter 114.

EM system 200 is used by adapter 114 to manage communication of events reported by various functions (both physical functions and virtual functions) to various processors. The EM system 200 includes a plurality of PF event collectors, for example, PF0 event collector 202, PF1 event collector 210 and PFn event collector 218. The EM system 200 may also includes a plurality of VF event collectors VF01 event collector 204, VF0N event collector 206, VF11 event collector 212, VF1N event collector 214, VFn1 event collector 220 and VFnN event collector 222.

PF0 event collector 202 may be configured to couple to PF0 physical function 118. PF0 event collector 202 may be configured to detect and collect events generated by PF0 physical function 118. VF01 event collector 204 may be configured to couple to VF01 virtual function 154. VF01 event collector 204 may be configured to detect and collect events generated by VF01 virtual function 151. Similarly, VF0N event collector 206 may be configured to couple to VF0N virtual function 158. VF0N event collector 206 may be configured to detect and collect events generated by VF0N virtual function 154.

PF1 event collector 210 and PFn event collector 218 may be configured similar to PF0 event collector 202. VF11 event collector 212, VF1n event collector 214, VFn1 event collector 220 and VFnN event collector 222 may be configured similar to VF01 event collector 204.

In one embodiment, each of the physical functions and virtual functions may set a flag, for example, in a register, to indicate that the function has an event to report to a processor.

Each of the event collectors may include a status register. For example, event collector 202 may include a status register 201. Similarly, event collector 204 may include a status register 203 and event collector 206 may include a status register 205. Status register may be used by the event collector to keep track of the status of the events reported by functions. For example, the status register may be used to track the status of the events that have been received, status of events that have been reported to the processor and status of events that have been read by the processor.

EM System 200 may also include a first set of arbitration modules 208, 212 and 224. In one embodiment, each arbitration module is configured to receive output of event collectors from a physical function hierarchy, for example, a physical function and corresponding virtual functions of the physical function. For example, PF0 arbitration module 208 may be configured to receive output from PF0 event collector 202, VF01 event collector 204 and VF0N event collector 206.

Similarly, PF1 arbitration module 316 may be configured to receive output from PF1 physical function hierarchy, for example, from PF1 event collector 210, VF11 event collector 212 and VF1N event collector 214.

Similarly, PFn arbitration module 224 may be configured to receive output from PFn physical function hierarchy, for example, from PFn event collector 218, VFn1 event collector 220 and VFnN event collector 222.

PF0 arbitration module 208 evaluates the events reported by PF1 event collector 202, VF01 event collector 204 and VF0N event collector 206. Based upon a selection scheme (for example, a round-robin selection process), the PF0 arbitration module 208 selects one from amongst all the interrupting functions within a physical function hierarchy.

For example, assuming PF0 physical function, VF01 virtual function and VF0N virtual function all raised a flag to report an event, the PF0 arbitration module 208 selects an event from one of functions PF0 physical function, VF01 virtual function and VF0N virtual function for reporting. After the selection, signal 209 is generated and presented to masking logic 226. Signal 209 indicates the selected function from the PF0 physical function hierarchy.

Similarly, PF1 arbitration module 216 selects one amongst all the interrupting functions within PF1 physical function hierarchy. Signal 215 is sent to masking logic 226 and represents the selected function within PF1 physical function hierarchy.

Similarly, PFn arbitration module 224 selects one amongst all the interrupting functions within PFn physical function hierarchy. Signal 223 is also presented to masking logic 226 and represents the selected function within PFn physical function hierarchy.

The masking logic 226 receives signals 209, 215 and 223 and a PF to Processor Mapping information 227 (PPM information) from PPM logic 228. PPM logic 228 may be used to store PPM information. The PPM information 227 includes information regarding which functions are mapped to certain processors. PPM information 227 may be used by the masking logic 226 to mask the signals 209, 215 and 223 based on the mapping.

Masking logic 226 selects events corresponding to a particular processor. Masking logic 226 generates signals for the selected events and sends them to an arbitration module from among a second set of arbitration modules. For example, signals 230, 232 and 234 are for processor 0 124 and are presented to arbiter 242. Arbiter 242 is then used for selecting one of the signals 230, 232 and 234. Arbiter 242 may use a round-robin or any other technique to select one of the signals.

Similarly, signals 236, 238 and 240 are for processor 1 126 and are presented to processor 1 arbiter 244. Processor x Arbiter 246 is used for receiving signals (not shown) for Processor 128 128.

Selection logic 250 (also referred to as a multiplexer 250) is configured to receive event status 248 from each of the selected functions for processor 0. One of the event statuses is output based upon a control signal 252, which is generated from arbiter 242.

Multiplexer 256 and multiplexer 260 may be configured similar to multiplexer 250. For example, multiplexer 256 may be configured to receive event status 255 from each of the selected functions for processor 1 and present one of the event status as output based upon a control signal received by the multiplexer 256.

Processor 0 124 receives output 268 from multiplexer 250. In one embodiment, output 268 includes the number (i.e. identity) of the physical function and virtual function for which status needs to be read. The processor 0 124 reads a corresponding status register for the function identified in signal 268.

In one embodiment, the number of the physical function and virtual function read by the processor 0 124 is fed as signal 266 to a function interrupt acknowledge logic 270 ("FIA logic"). The FIA logic 270 also receives the address of the event report register read by the processor 0 124, as signal 264. Using signal 266 and signal 264, FIA logic 270 determines the function for which the status was read by processor 0 124 and generates a signal 272 to indicate to the particular function that status was read by the processor.

For example, signal 272 may be received by corresponding selected function within PF0 physical function hierarchy. In one embodiment, corresponding event collector may reset a flag to indicate that reported event has been read by the corresponding processor. As an example, if VF01 virtual function was selected to report an event to processor 0 124, then, signal 272 may be used by VF01 event collector 206 to clear any flags corresponding to event status read by processor 0 124.

In one embodiment, processor 0 124 takes necessary actions, based upon the event reported by the selected function. In one embodiment, based upon the reported event, processor 0 124 may generate messages and communicate generated message to devices coupled to port 0 132.

As one skilled in the art appreciates, processor 1 arbiter 244 and processor X arbiter 246 may operate similar to processor 0 arbiter 242, as discussed above.

Figure 3:
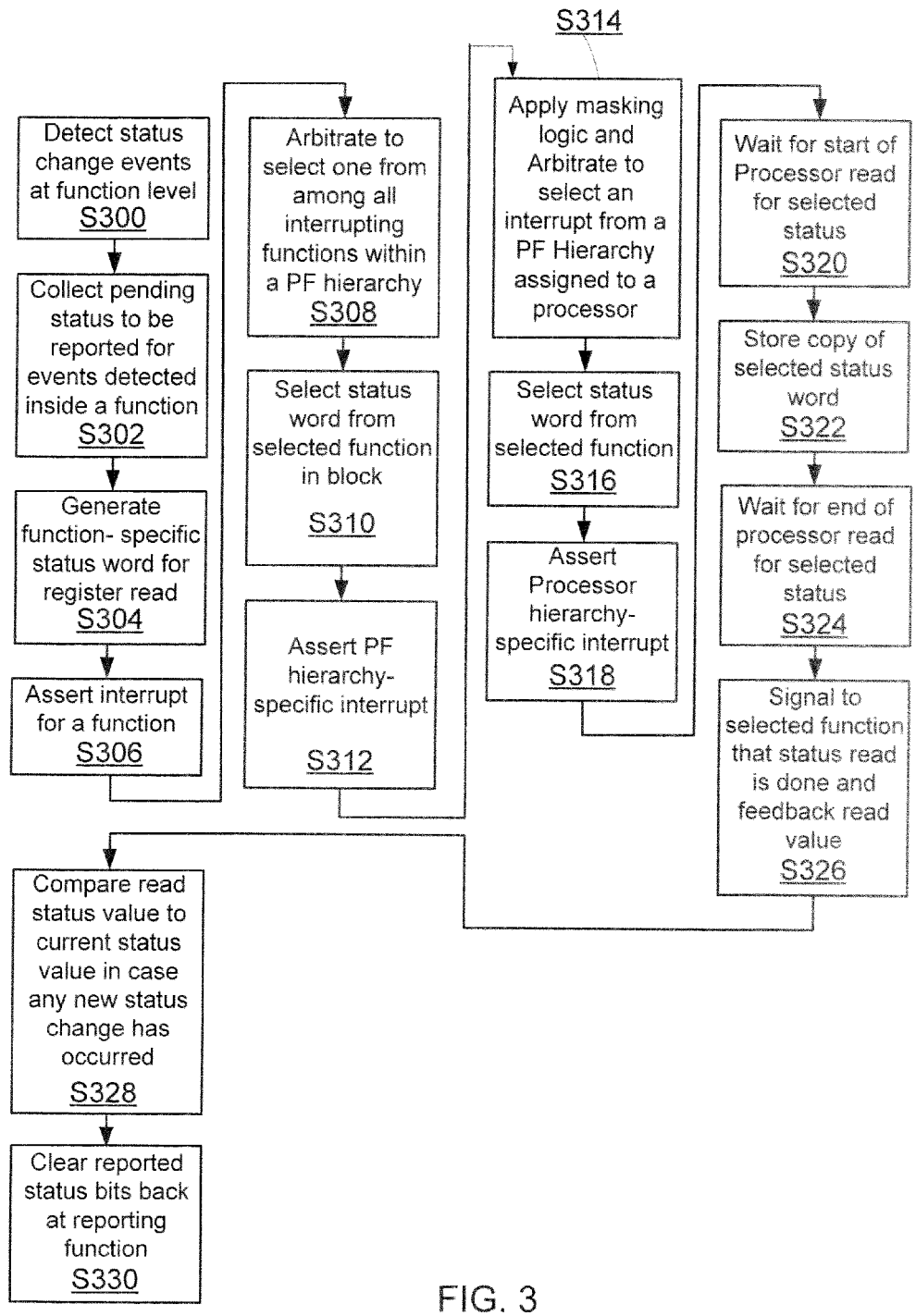
FIG. 3 shows an example of a method for processing events generated by a plurality of functions, according to one embodiment.

Now referring to FIG. 3, a method for processing events generated by a plurality of functions is described.

In block S300, function level status change events are detected. This may occur in one of the event collectors, for example, PF0 event collector 202, VF01 event collector 204 and VF0N event collector 206.

In block S302, pending status be reported for events detected in a function is collected and stored for future reporting to a processor. For example, the pending status may be collected for a physical function and/or a virtual function.

In block S304, a function specific status word is generated. For example, function specific status word may be generated for PF0 physical function, VF01 virtual function and VF0N virtual function. In one embodiment, the function specific status word may be stored in status registers 201, 203 and 205 for PF0 physical function, VF01 virtual function and VF0N virtual function respectively.

In block S306, an interrupt for a function is asserted. For example, interrupt for PF0 physical function, VF01 virtual function and VF0N virtual function for PF hierarchy 0 is fed to PF0 arbitration module 208.

In block S308, one of the interrupting functions within a PF hierarchy is selected. For example, the PF0 arbitration module 208 selects one of the interrupts from PF0 event collector, VF01 event collector and VF0N event collector.

In block S310, the status word from the selected function within a hierarchy is selected and presented to masking logic 226.

In block S312, PF hierarchy specific interrupt is asserted.

In block S314, after applying a masking logic, certain arbitration requests, for example, signals 230, 232, 234 (FIG. 2) are fed into individual processor based arbitration modules. PF hierarchy assigned to a processor is arbitrated and one of the asserted interrupts for a processor is selected. For example, processor 0 function signals 230, 232 and 234 for processor 0 are arbitrated by arbiter 242 and one of the processor 0 function signals is selected.

Figure 2:
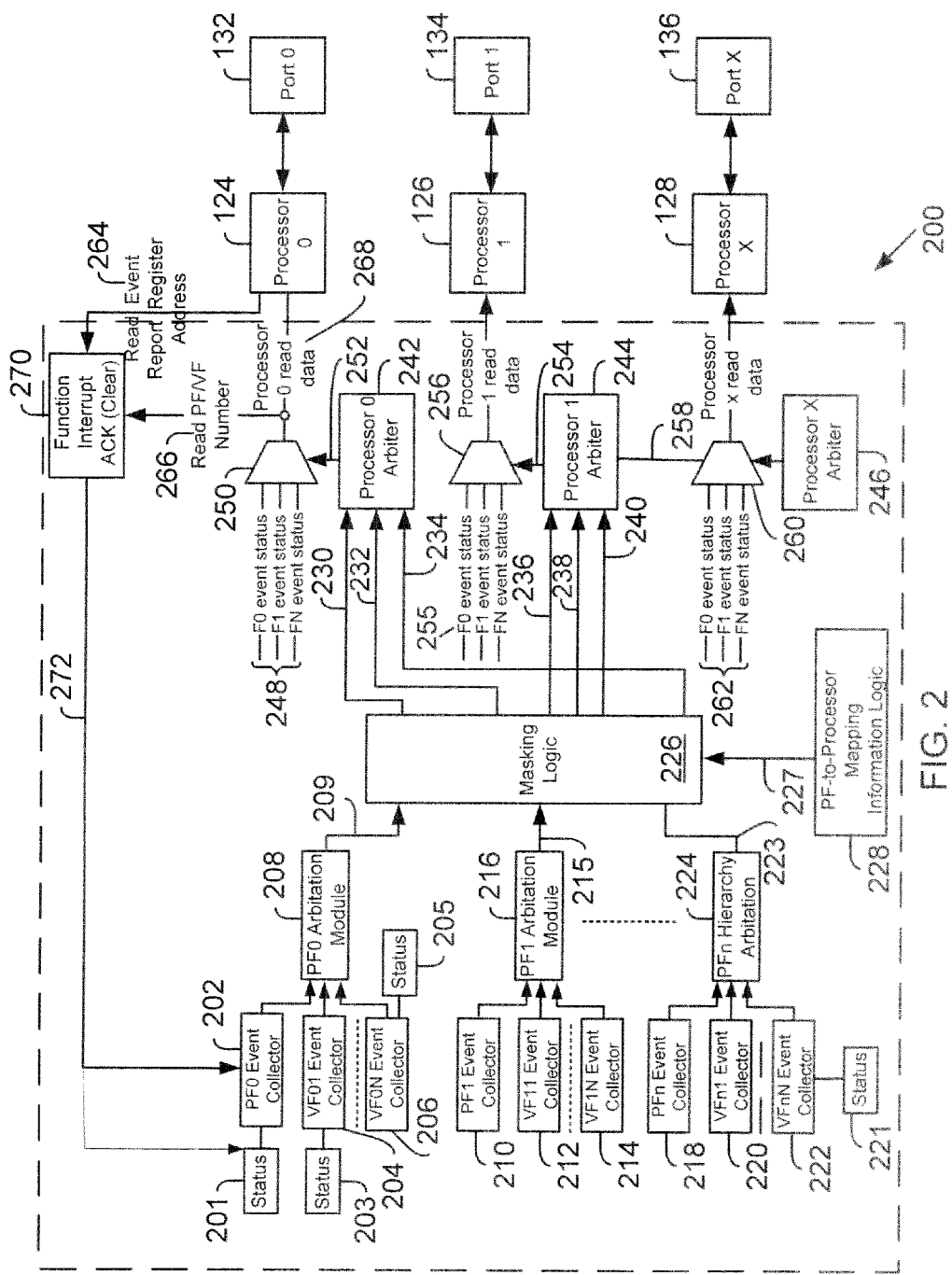
FIG. 2 shows an example of an event management system, according to one embodiment.

In block S316, a status word for the selected function is selected, for example, as shown by signal 252 (FIG. 2).

In block S318 Processor hierarchy specific interrupt is asserted. This is shown as the output from multiplexer 250.

In block S320, the process waits for the start of processor read of the selected status.

In block S322, a copy of the selected status word is stored. For example, a copy of the selected status word at the output of the multiplexer 250 is stored in FIA logic 270. In addition, the address of the event report register read by the processor 0 124 is fed to the FIA logic 270.

In block S324, wait for end of processor read for selected status.

In block S326, upon completion of processor read, signal to selected function that status read is done. Also, FIA logic sends a copy of the data that was read by the processor 0 124 back to the function.

In block S328, the read data that sent back to the function is compared with information in register 201. One reason for sending the read data and comparing it with stored data is to make sure that there is no new event is happening during processor read resulting in a mismatch between data stored in register 201 and data that is actually read by the processor.

In block S330, if there is no difference, the status bits are reset to indicate that processor 0 124 has read the current status associated with the latest event reported by the function.

If there is a difference between the data read and the data stored in register 201, then only the reported bits (i.e. the matched bits) are cleared. The unmatched bits are processed in a different cycle.

Figure 4:
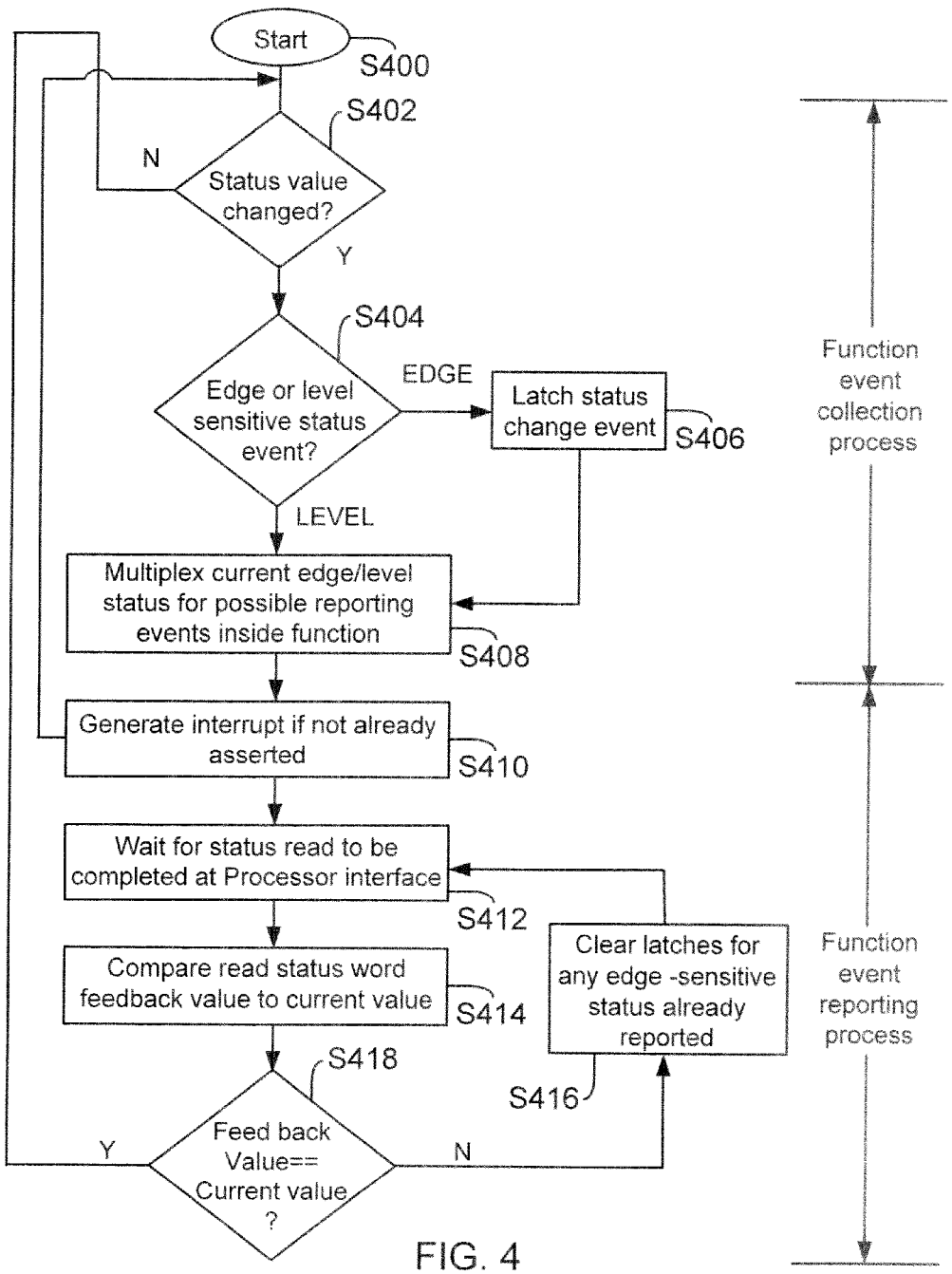
FIG. 4 shows a process flow diagram for status event collection and reporting at a function level, according to one embodiment.

Now referring to FIG. 4, a process, according to one embodiment, for status event collection and reporting at a function level will be described. Status event reporting process is described with reference to blocks S400-S410. Function event reporting process is described with reference to blocks S412-S418.

In block S400, the process for status event collection starts.

In block S402, the status is checked to see if any event for a function needs to be reported. In one embodiment, physical function or virtual function sets a flag to indicate that an event needs to be reported. For example, in one embodiment, the PF event collectors and VF event collectors check to see if a flag has been set to indicate availability of an event for reporting to a processor.

In one embodiment, the events may fall into multiple categories, edge or level, based upon the type of event. An edge event is an event for which an indicator is only provided temporarily. An example, of an edge event is a "data link down", "a hot reset", a function level reset "FLR", a D3 entry, a function error and others. The edge events are typically under the control of host system 102 and may change over time.

A level event is an event that is indicated by a persistent indicator until the event is processed and serviced. For example, a maximum read request size change, internal adapter error and others are level events. Typically, a level event is not within the control of host system 102 and maybe under the control of adapter 114.

In block S402, the status value is checked to see if it is an edge event or a level event.

If it is an edge event, the status is latched in block S406. For example, the status is latched in 202, 204 . . . 222 of system 200 of FIG. 2.

Then, in block S400, current edge event and level event status is multiplexed for a given function hierarchy. For example, current edge event and level event status is multiplexed in arbitration module. For example, status for PF0 hierarchy functions are multiplexed in PF0 arbitration module 208.

Then, in block S410, an interrupt is generated for the PF hierarchy. For example, signal 209 is generated for PF0 hierarchy.

Now, function event reporting process will be described with reference to blocks S412-S418 of FIG. 4.

In block S412, the function waits for the status to be read by the processor. For example, the function waits for signal 272 from the FIA logic 270. Upon completion of the reading of status by the processor, the status word read by the processor is sent as signal 272.

In block S414, the status word read by the processor is compared with the status word available at the function.

In block S418, if the status word read by the processor is same as the status word available at the function, it indicates that the status of the function is current. Now, the system 200 waits for a change in the status for the function, in block S402.

If in block S418, the status word read by the processor is different than the status word available at the function, in block S416, the latches for any edge level event reports are cleared and the function waits for the processor to read updated status in block S412.

Figure 5:
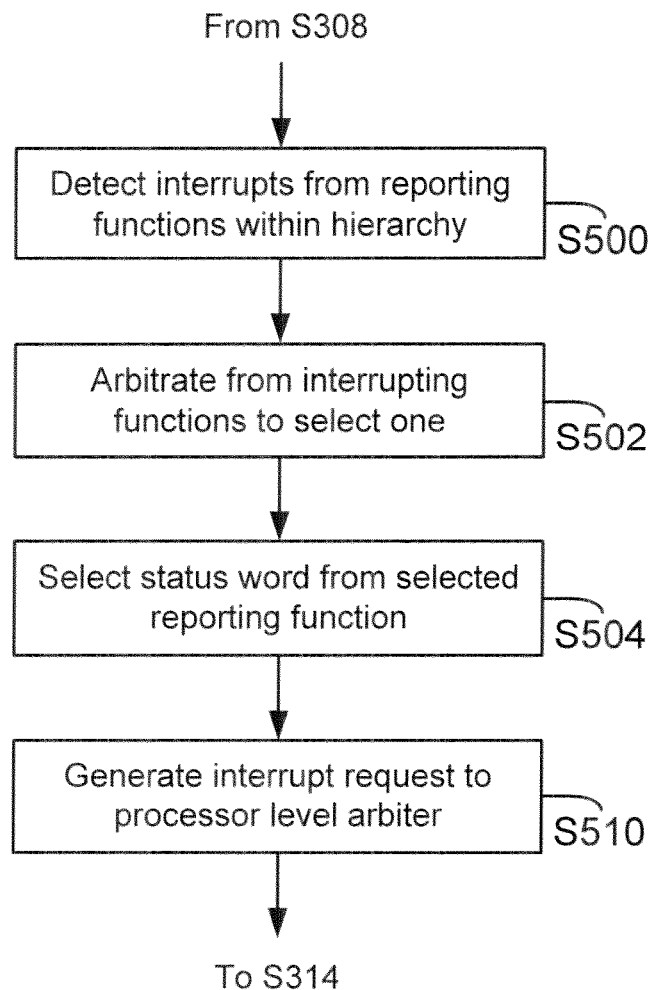
FIG. 5 shows a process flow diagram for physical function hierarchy level status reporting, according to one embodiment.

Now referring to FIG. 5, process for PF hierarchy level status reporting will be described. This process further describes exemplary implementation of blocks S308-S312 of FIG. 3.

In block S500, interrupt from reporting functions within a processor function hierarchy is detected. For example, within a PF0 hierarchy, interrupts may be reported by one or more of PF0 physical function, VF01 virtual function and VF0N virtual function. For example, interrupt from reporting function within PF0 hierarchy may be detected in PF0 arbitration module 208.

In block S502, interrupting functions within a PF hierarchy is arbitrated and one of the interrupting function within a hierarchy is selected. For example, PF0 arbitration module 208 selects one of the interrupting functions within PF0 hierarchy.

In block S504, status word from selected reporting function is selected. For example, if VF01 virtual function was selected, then, the status word for VF0 virtual function is selected.

In block S510, interrupt request is generated for processor level arbiter. For example, interrupt request is generated by PF0 arbitration module 208 by asserting signal 209 to the masking logic 226. The masking logic 226 in turn applies a processor level masking and asserts processor specific interrupt request, for example, asserts signals 230, 232 and 234 for processor 0 arbiter 242.

Figure 6:
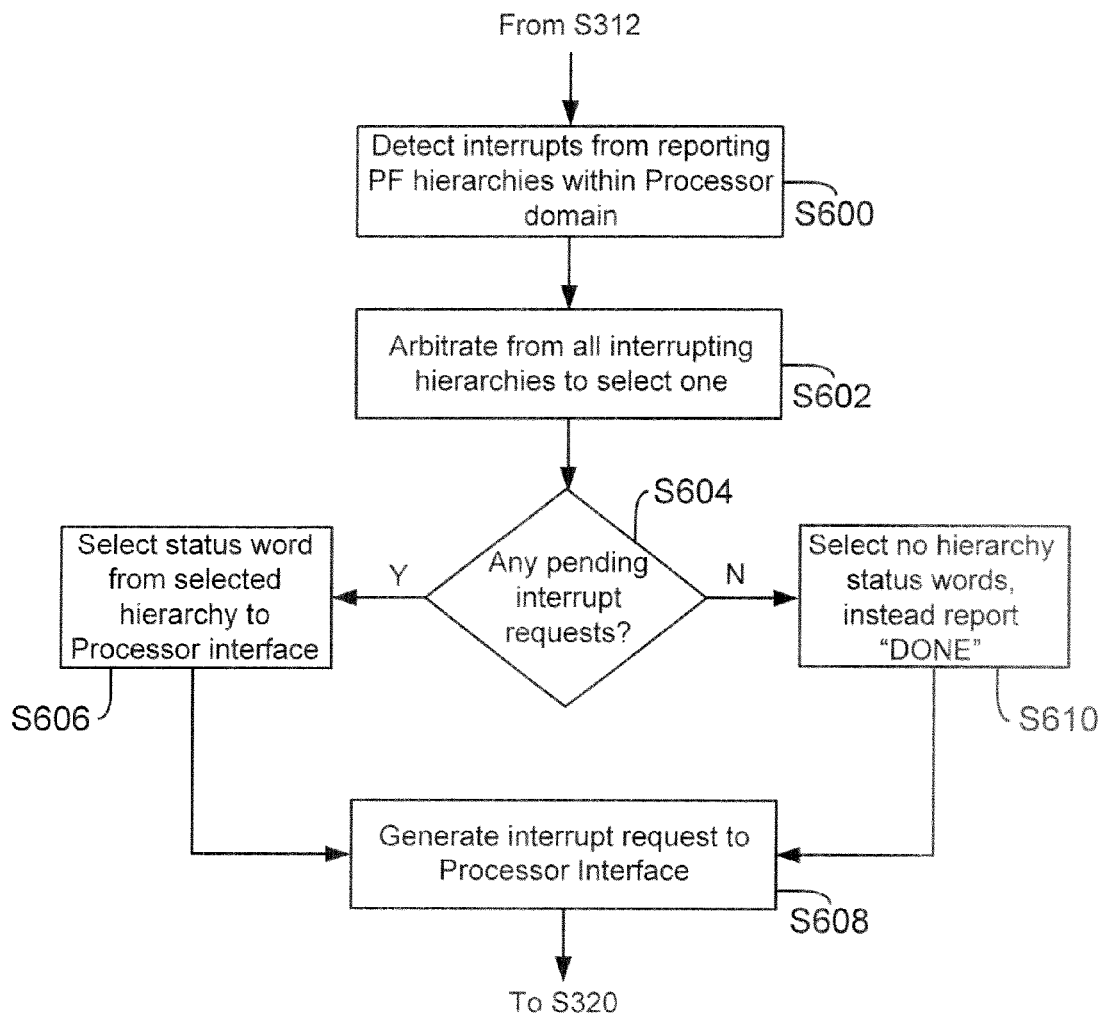
FIG. 6 shows a process flow diagram for reporting events to a processor, according to one embodiment.

Now referring to FIG. 6, process for reporting events to a specific processor is disclosed. This process further describes exemplary implementation of blocks S314-S318 of FIG. 3.

In block S600, interrupts from reporting PF hierarchy within a processor domain is detected. For example, interrupts from PF0 hierarchy for processor 0 is detected by the processor 0 arbiter 242.

In block S602, one of the hierarchy functions from all interrupting hierarchy function is selected. For example, processor 0 arbiter 242 selects PF0 hierarchy function.

In block S604, a check is performed to detect any pending interrupt request. For example, the processor 0 arbiter 242 checks to see if there is any pending interrupt requests.

If there are any pending interrupt requests, in block S606, status word from selected hierarchy is selected and presented to the processor interface. For example, if PF0 hierarchy was selected, then, processor 0 arbiter 242 asserts signal 252 to the multiplexer 250 so as to select F0 event status word to be presented at the output of multiplexer 250.

In block S608, an interrupt is generated for the processor interface. The interrupt generated for the processor interface initiates reading of the status word at the output of the multiplexer 250. For example, F0 event status word is presented to the processor 0 interface, as signal 268. Interrupt is generated to the processor interface of processor 0 124 so that processor 0 124 reads the presented status word. For example, processor 0 arbiter 242 may generate an interrupt to processor interface (not shown) of processor 0 124.

If in block S604, there are no more pending interrupt requests, in block S610, no status word is selected. A status code indicating DONE is reported to the processor interface; For example, processor 0 arbiter 242 indicates a DONE status to the processor interface of processor 0 124.

Figure 7:
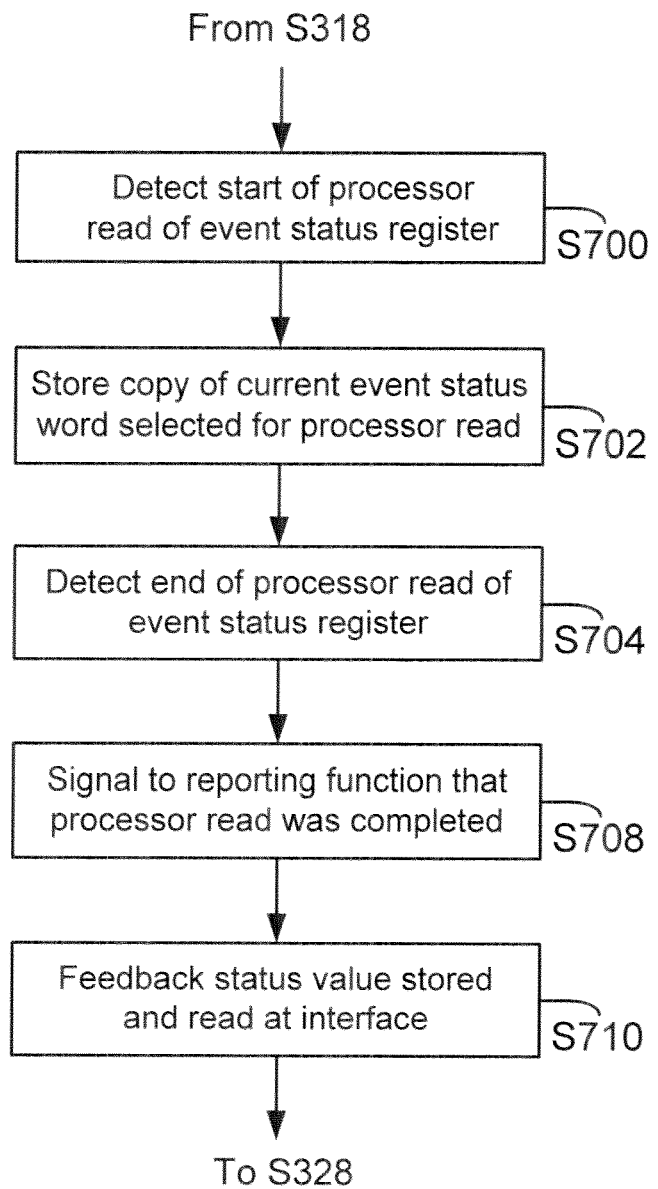
FIG. 7 shows a process for processor event status reporting, according to one embodiment.

Now referring to FIG. 7, process for processor event status reporting is disclosed. This process further describes exemplary implementation of blocks S320-S326 of FIG. 3.

In block S701, start of the processor read of event status register is detected. For example, processor interface of processor 0 124 detects the start of processor read of event status register. In one embodiment, the event status register may be located at a specific predetermined address location.

In block S702, a copy of the status word for the selected function is stored. For example, if F0 function was selected, the status word for F0 function is stored in the processor interface of processor 0 124.

In block S704, end of processor read of event status register is detected. For example, processor interface of processor 0 124 detects end of processor 0 read of event status register.

In block S708, a signal is sent to the reporting function that processor has read the event status. For example, the FIA logic reports to F0 function that selected function event was read by processor 0, by sending a signal 272.

In block S710, stored status word for the selected function is fed back to the selected function. For example, status word for the selected function that was stored at the processor interface of processor 0 124 fed back to the selected function using FIA logic.

As one skilled in the art appreciates, the method and system of this disclosure provides one or more benefits as articulated below, For example, some embodiments of this disclosure permit reduction of connection traces to couple event status of a plurality of functions to mapped processors.

Some embodiments of this disclosure permit sharing of paths between a plurality of functions and a plurality of processors.

Some embodiments of this disclosure permit a process to provide handshake signals between a function and a processor, to indicate completion of the interrupt servicing by a processor.

Although the present disclosure has been described with reference to specific embodiments, these embodiments are illustrative only and not limiting. Many other applications and embodiments of the present disclosure will be apparent in light of this disclosure.

What is claimed is:

1. A method for an adapter, comprising:
   (a) providing a plurality of function hierarchies associated with the adapter, each hierarchy including a plurality of functions and each function being associated with an event that is processed by a processor from among a plurality of processors of the adapter; wherein each function hierarchy is assigned a first arbitration module that is used for arbitrating between interrupt request signals originating from the function hierarchy; and each of the processors has an assigned second arbitration module configured to arbitrate between the interrupt request signals for events that are associated with a specific one of the processors, wherein each function hierarchy includes at least a physical function and at least a virtual function associated with the physical function;
   (b) collecting event status for the plurality of functions associated with the plurality of function hierarchies;
   (c) based on the collected event status, generating the interrupt request signals for each function within a function hierarchy that had a change in status, wherein the interrupt request signals for each function hierarchy are sent to the assigned first arbitration module for arbitration;
   (d) selecting a function from each of the plurality of function hierarchies; wherein each of the assigned first arbitration modules selects one of the interrupt request signals for each function hierarchy;
   (e) sending all the interrupt request signals associated with events for the specific processor from among the plurality of processors to the second arbitration module assigned to the specific processor;
   (f) selecting one of the interrupt request signals based on an arbitration performed by the assigned second arbitration module;
   (g) processing an event associated with the interrupt request signal selected in step (f); and
   (h) applying a masking logic for selecting functions for events that are associated with a specific processor.

2. The method of claim 1, further comprising:
   generating a status word for tracking each event associated with a function.

3. The method of claim 1, wherein the specific processor reads a status word associated with the selected interrupt signal and the function is notified after the status word is read.

4. The method of claim 1, wherein the adapter is operationally coupled to a computing system for sending and receiving network information.

5. A network adapter, comprising:
   a plurality of function hierarchies associated with the adapter, with each function hierarchy including a plurality of functions and each function being associated with an event, wherein each function hierarchy includes at least a physical function and at least a virtual function associated with the physical function;
   a plurality of processors of the adapter for processing one or more events generated by the plurality of functions; wherein each of the plurality of functions is associated with a processor from among the plurality of processors;
   a first set of arbitration modules, wherein each arbitration module is associated with a function hierarchy and receives interrupt request signals from the functions within the associated function hierarchy, arbitrates between pending interrupt request signals and selects one of the interrupt request signals;

a masking logic that receives a plurality of interrupt request signals from the first set of arbitration modules and separates the interrupt request signals based on associated processors; and a second set of arbitration modules, wherein each arbitration module of the second set receives processor-specific interrupt request signals and selects one of the interrupt request signals for processing an event associated with the selected interrupt request signal; wherein the event is processed by an associated processor.

6. The adapter of claim 5, further comprising:

a plurality of event collectors that collect event information for events associated with the functions of the plurality of function hierarchies and a status word is used for tracking each event.

7. The adapter of claim 6, wherein a specific processor reads the status word associated with an event and an associated function is notified after the status word is read.

8. The method of claim 5, wherein the adapter is operationally coupled to a computing system for sending and receiving network information.

9. A system, comprising:

a computing system operationally coupled to a network adapter that is operationally coupled to a network device, the network adapter includes:

a plurality of function hierarchies associated with the adapter, with each function hierarchy including a plurality of functions and each function being associated with an event, wherein each function hierarchy includes at least a physical function and at least a virtual function associated with the physical function;

a plurality of processors of the adapter for processing one or more events generated by the plurality of functions; wherein each of the plurality of functions is associated with a processor from among the plurality of processors;

a first set of arbitration modules, wherein each arbitration module is associated with a function hierarchy and receives interrupt request signals from the functions within the associated function hierarchy, arbitrates between pending interrupt request signals and selects one of the interrupt request signals;

a second set of arbitration modules, wherein each arbitration module of the second set receives processor-specific interrupt request signals and selects one of the interrupt request signals for processing an event associated with the selected interrupt request signal; wherein the event is processed by an associated processor; and a masking logic that receives a plurality of interrupt request signals from the first set of arbitration modules and separates the interrupt request signals based on associated processors.

10. The system of claim 9, wherein the network adapter further includes:

a plurality of event collectors that collect event information for events associated with the functions of the plurality of function hierarchies and a status word is used for tracking each event.

11. The system of claim 10, wherein a specific processor reads the status word associated with an event and an associated function is notified after the status word is read.

* * * * *

UNITED STATES PATENT AND TRADEMARK OFFICE
CERTIFICATE OF CORRECTION

| | | |
|---|---|---|
| PATENT NO. | : 8,504,750 B1 | Page 1 of 1 |
| APPLICATION NO. | : 12/572835 | |
| DATED | : August 6, 2013 | |
| INVENTOR(S) | : Sonksen et al. | |

It is certified that error appears in the above-identified patent and that said Letters Patent is hereby corrected as shown below:

On the title page, Item [57], under "ABSTRACT", in column 2, line 3, Delete "plural" and insert -- plurality of --, therefor.

In the Specification

Column 1, line 32, After "plurality" insert -- of --.

Column 2, line 11, Delete "process" and insert -- processor --, therefor.

Column 3, line 45, Delete "126." and insert -- 128. --, therefor.

Column 4, line 43, Delete "151." and insert -- 154. --, therefor.

Column 4, line 67, Delete "212" and insert -- 216 --, therefor.

Column 5, line 7, Delete "316" and insert -- 216 --, therefor.

Column 5, line 16, Delete "PF1" and insert -- PF0 --, therefor.

Column 7, line 24, After "that" insert -- is --.

Column 8, line 4, Delete "S400," and insert -- S408, --, therefor.

Column 9, line 22, Delete "interface;" and insert -- interface. --, therefor.

Column 9, line 28, Delete "S701," and insert -- S700, --, therefor.

Column 9, line 48, After "124" insert -- is --.

Signed and Sealed this
Thirteenth Day of May, 2014

Michelle K. Lee
*Deputy Director of the United States Patent and Trademark Office*